United States Patent
Gogolides et al.

(10) Patent No.: US 8,951,428 B2
(45) Date of Patent: Feb. 10, 2015

(54) METHOD FOR THE FABRICATION OF PERIODIC STRUCTURES ON POLYMERS USING PLASMA PROCESSES

(76) Inventors: Evangelos Gogolides, Attiki (GR);
Angeliki Tserepi, Attiki (GR); Vassilios Constantoudis, Attiki (GR); Nikolaos Vourdas, Attiki (GR); Georgios Boulousis, Attiki (GR); Maria-Elena Vlachopoulou, Attiki (GR); Aikaterini Tsougeni, Attiki (GR); Dimitrios Kontziampasis, Attiki (GR)

(*) Notice: Subject to any disclaimer, the term of this patent is extended or adjusted under 35 U.S.C. 154(b) by 874 days.

(21) Appl. No.: 12/997,701

(22) PCT Filed: Jun. 15, 2009

(86) PCT No.: PCT/GR2009/000039
§ 371 (c)(1),
(2), (4) Date: Mar. 28, 2011

(87) PCT Pub. No.: WO2009/150479
PCT Pub. Date: Dec. 17, 2009

(65) Prior Publication Data
US 2011/0165382 A1    Jul. 7, 2011

(30) Foreign Application Priority Data
Jun. 13, 2008  (GR) .................................. 080100404

(51) Int. Cl.
| B44C 1/22 | (2006.01) |
| B29C 59/14 | (2006.01) |
| B29K 25/00 | (2006.01) |
| B29K 33/00 | (2006.01) |

(Continued)

(52) U.S. Cl.
CPC ............. *B29C 59/14* (2013.01); *B29K 2023/06* (2013.01); *B29K 2025/00* (2013.01); *B29K 2033/12* (2013.01); *B29K 2067/00* (2013.01); *B29K 2083/00* (2013.01)
USPC .................. 216/64; 216/58; 216/81; 438/714; 438/725

(58) Field of Classification Search
USPC .................. 216/24, 40, 41, 56, 67, 63, 64, 81; 438/706, 714, 717, 725
See application file for complete search history.

(56) References Cited

U.S. PATENT DOCUMENTS

| 5,173,146 A | 12/1992 | Ito et al. |
| 5,399,236 A * | 3/1995 | Ha et al. ........................ 438/720 |

(Continued)

FOREIGN PATENT DOCUMENTS

| WO | WO 2004/024805 A | 3/2004 |
| WO | WO 2007/031799 A | 3/2007 |
| WO | WO 2008/064663 A | 6/2008 |

OTHER PUBLICATIONS

ISR for PCT/GR2009/000039, Sep. 28, 2009.

*Primary Examiner* — Lan Vinh
(74) *Attorney, Agent, or Firm* — Gianna Julian-Arnold; Saul Ewing LLP

(57) ABSTRACT

This invention presents a method for the fabrication of periodic nanostructures on polymeric surfaces by means of plasma processing, which method comprises the following steps:
(i) provision of a homogeneous organic polymer (such as PMMA, or PET, or PEEK, or PS, or PE, or COC) or inorganic polymer (such as PDMS or ORMOCER);
(ii) exposure of the polymer to an etching plasma such as oxygen ($O_2$) or sulphur hexafluoride ($SF_6$) or a mixture of oxygen ($O_2$) and sulphur hexafluoride ($SF_6$), or mixtures of etching gases with inert gases such as any Noble gas (Ar, He, Ne, Xe).

22 Claims, 10 Drawing Sheets

(51) Int. Cl.
*B29K 67/00* (2006.01)
*B29K 83/00* (2006.01)

(56) References Cited

U.S. PATENT DOCUMENTS 7,329,871 B2 * 2/2008 Fan et al. ............ 250/353

7,799,416 B1 * 9/2010 Chan et al. ............ 428/304.4
2003/0118800 A1 * 6/2003 Thomas et al. ............ 428/215
2005/0164514 A1 * 7/2005 Rauf et al. ............ 438/710
2006/0175551 A1 * 8/2006 Fan et al. ............ 250/353
2006/0236917 A1 * 10/2006 Denda ............ 117/60

* cited by examiner

METHOD FOR THE FABRICATION OF PERIODIC STRUCTURES ON POLYMERS USING PLASMA PROCESSES

FIELD OF THE INVENTION

This invention relates to a plasma-directed method of self-assembly for the fabrication of periodic structures with controlled geometrical characteristics on polymer/plastic materials. These have applications in nano-patterning for nanoelectronics, nanophotonics and related fields.

BACKGROUND TO THE INVENTION

Periodic and well-defined features in the nano-scale are essential in several fields. These include photonics, optical applications such as diffraction gratings and antireflection surfaces, nanoelectronics, high-density information storage media, catalysis, bioanalytics, medicine and many others.

The "periodicity" of a pattern formed on a surface can be mathematically rigorously described by performing a circularly averaged Fast Fourier Transform (FFT) of the surface heights, or by calculating the Height-Height Correlation Function (HHCF) of a surface. A completely periodic, deterministic surface will display an approximately delta-function peak in the Fourier transform, and a persistent oscillation in the HHCF. The inverse of the peak position of the FFT is the wavelength or periodicity of the structures.

Self-assembly methods (as defined below) often lead to surfaces exhibiting a peaked FFT, and several oscillations in the HHCF. The narrower the peak in the FFT, and the larger the extent of the oscillations in the HHCF, the more periodic the pattern is. Periodicity is quantified by the full width at half maximum (FWHM) of the FFT. The inverse of this quantity is the system correlation length, which shows the extent of the persistence of order, and should be larger than the wavelength of the periodic structures.

In highly periodic surfaces a sharp narrow peak tends to exist in the FFT and several oscillations in the HHCF. For less periodic surfaces only a broad peak exists in the FFT, and only a few small-amplitude oscillations in the HHCF. In stochastic columnar-like surfaces, no peak is observable in the FFT, nor any oscillations in the HHCF, but one may define an average column diameter and separation distance with a large standard deviation.

Aspect ratio is defined as the height divided by the diameter of a structure. High Aspect Ratio (HAR-HSA) structures are typically defined as those with a value of aspect ratio which is larger than 3 and Low Aspect Ratio (LAR) structures are those which typically have a smaller value of the aspect ratio.

A variety of methods may be employed to attain the desired patterning; the most commonly used being photolithography ("top-down") techniques. However conventional photolithography schemes, although capable of achieving below 32 nm resolution using 193 nm lithography and resolution enhancement methods, or Extreme Ultra Violet Lithography (EUV) at 13.5 nm, are extremely costly. Other "top down" methods such as electron beam or ion beam lithography are slow step-wise processes.

These drawbacks have motivated the development and implementation of alternative patterning techniques that do not utilise pre-formed/patterned mask or serial writing. Such techniques include: (a) self-assembly approaches to create patterns, or (b) spontaneous formation of patterns in the course of an appropriately tuned process.

Definitions of "self-assembly" vary hugely and generalisation is somewhat difficult[1]. Self-assembly processes often lead to autonomous organization of components into structurally well-defined patterns, without direct human intervention, either through physical or chemical forces. Also, the self assembly may be assisted by, for example, bio-molecules[2], colloidal particles[3], Langmuir-Blodgett films[4], poly(styrene)-PS nano-spheres[5] and block-copolymers[6].

The self-assembly processes, however, suffer from a poor degree of control of spatial and size distribution of the resulting nanostructures. Furthermore, the processes are only applicable to limited classes of materials. Additionally, there are often problems with low throughput or low homogeneity in large areas of the pattern. Moreover, by-products are sometimes generated in the wet-chemical preparation, which makes it difficult to keep the surface clean. In addition specific polymer or other materials are often needed to implement self-assembly, such as block-copolymers, or nanospheres.

Since, among other drawbacks, periodicity cannot be controlled over large areas in the above methods, ad-hoc techniques such as graphoepitaxy (or pattern-directed self-assembly) may be employed. Graphoepitaxy requires the pre-formation of a specific pattern which directs self-assembly for forming highly periodic structures[6].

As mentioned above, "spontaneous formation" of patterns may be used as an alternative to self assembly. Spontaneous formation of well organized structures can be directed, for example, by chemical or electrochemical means[7] or thermal-mechanical means[8]. Alternatively, it may be directed by "dry" processes such as laser[9] or plasma[10] which may lead to patterns that are formed during a particular process, without mask, template, writing procedure or specific pretreatment to induce a pre-pattern.

In all of these processes a significant tuning of parameters is required in order to control the resulting surface morphology. Accordingly, these techniques do not fall into the "self-assembly" category since a particular process has to be implemented, necessitating direct human intervention. The term "process directed self-assembly", or self-organization may be used.

Of the techniques that induce spontaneous structure formation, "low-pressure plasma processes" provide some unique advantages in that they are dry, low temperature, clean-room compatible, flexible and amenable to mass production/large area/high throughput[10]. Until now they have been directed towards fabricating periodic, self-organizing ripple-like patterns such as in the case of poly(dimethyl siloxane)-PDMS after oxygen plasma treatment[11-13]. In this case deformation and periodic waves (ripple-like) occur due to the formation of $SiO_2$ at the interface between the oxygen plasma sheath and polymer surface, under the effect of the induced stress. Because of the specific mechanism involved, this self-organization process takes place only in elastomeric Si-polymers under oxygen-based plasmas. Furthermore, only ripple-like or worm-like structures are produced, as opposed to "bump-" or mound-like morphology. Such a ripple-like morphology may also be induced by pre-stretching, ion-beam crosslinking, and thermally annealing the polymer sample[14].

In general, the use of plasmas leads to surface roughening of both organic or inorganic polymers. Even though it is not fully understood how the roughness evolves, oxygen-based plasmas are employed to produce nano-texturing of the surface of many organic polymers. These include polymers such as fluorinated poly(imide)[15] and fluorinated poly(ether)[16]. Applications of oxygen based plasmas include wetting control and superhydrophobic or super-hydrophilic surface fabrication on poly(propylene)-PP[17] and on poly(ethylene terepthalate)-PET[18] or on Si in the case of photoresist etching[19]. Oxygen based plasmas may also be employed, for example, for fabrication of superhydrophobic transparent surfaces on poly(methyl methacrylate)-PMMA[20], on SU-8[21] and for fabricating antireflective coatings on PMMA[22].

In WO04024805[23] there is described a method for reducing boundary surface reflection of plastic substrates. Oxygen based plasmas may also be employed to enhance the protein and cell adsorption of PMMA[24] and for electro-osmotic flow tuning in PMMA microfluidics[25].

In WO/2007/031799[26] there is described a plasma based method for the fabrication of High-Aspect Ratio and High Surface Area (HAR-HSA) columnar-like structures on any organic and inorganic polymer using appropriate plasma chemistry. In particular a method is described for the control of the wetting properties of surfaces, the flow in microchannels and the separation in microchannels.

However in the aforementioned cases plasma-induced nano-texturing delivers random columnar-like morphology and not well-defined, periodical, self-organized structures with controlled geometrical characteristics. Thus the resulting structures do not ideally serve as alternatives to structures derived from self-assembly techniques. In addition, although there are methods[22, 23] describing how to utilise ions resulting from plasmas in reducing reflectivity, there is often a lack of control of the geometrical characteristics and thus the precise broadband reflectance spectrum obtained. In addition, in methods described to date the plasma energies employed may lead to sample heating effects.

Another method to produce self-organised nanopatterns is ion-beam sputtering which may lead to nano-mound or nano-ripple formation on many substrates such as Si[27], GaSb[28], and InP, InAs[29, 30]. This method has been recently reviewed by Garcia[31]. This method suffers from the drawback of need of very high energy ions 300-2000 eV which may cause severe damage to the material, may heat it up, and is thus inappropriate for polymers. In addition it is an extremely slow process requiring hours of exposure to ion bombardment.

Finally there is recently a need to create periodic nanoholes or nanodots or nanopillars of metals to enhance surface Plasmon resonance effects, and thus affect the optical behaviour of thin metal films[32, 33], a field with vast applications from solar photovoltaic electrodes to nanoatnennas.

Embodiments of the techniques we describe provide a step towards solutions of these problems.

SUMMARY OF THE INVENTION

According to a first aspect of the invention there is therefore provided a method for the fabrication of nanostructures on polymeric surfaces by means of plasma processing, which method comprises the following steps:

(i) provision of a homogeneous organic polymer (such as PMMA, or PET, or PEEK (Poly ether ether Ketone) or PS or PE or COC) or inorganic polymer (such as PDMS or ORMOCER—registered tradename of a Silicon containing polymer);

(ii) exposure of the polymer to an etching plasma such as oxygen ($O_2$) or sulphur hexafluoride ($SF_6$) or a mixture of oxygen ($O_2$) and sulphur hexafluoride ($SF_6$), or mixtures of such etching gases with inert gases such as any Noble gas (Ar, He, Ne, Xe);

wherein the plasma treatment conditions including plasma reactor wall material, bias voltage, electrode temperature, processing time, pressure, and polymer physicochemical properties are selected appropriately to provide periodic nanostructures having a mound-like surface of uniformly spaced and sized protrusions wherein, upon statistical analysis of the nanostructures it is determined that the Height-Height Correlation Function (HHCF) of the surface of the nanostructure, G(r), shows at least one periodic maximum and one minimum, and the circularly averaged fast Fourier Transform (FFT) shows a distinct maximum.

Thus the invention provides a new plasma process, which may be termed "plasma-directed self-assembly", for the fabrication of self-organized, highly periodic, mound-like, nanostructures with controlled periodicity, spacing, width and height on organic (for example, PMMA, PET, PEEK) or inorganic (for example, PDMS, ORMOCER) polymer surfaces.

In accordance with a preferred embodiment of the main aspect of the invention there is provided a method wherein, prior to the plasma treatment step (ii), graphoepitaxy is performed to provide a lithographically patterned surface on which the geometry of the resulting nanostructures is confined. Even higher periodicity is attained by using graphoepitaxy, i.e. by confining the pattern in a specific area.

In a related embodiment the invention also provides a method for the fabrication of nanostructures on another surface, which method comprises providing a patterned polymeric surface fabricated in accordance with the main aspect of the invention and then effecting nanoscale pattern transfer on said other surface. Thus the patterned polymeric surfaces may be used for nanoscale pattern transfer via plasma etching or wet etching or contact printing or hot embossing or electrochemical deposition. Such nanoscale patterns are valuable in nanoelectronics, storage media, nanophotonics, magnetic media, templates for growth of nanowires, and related fields. Furthermore the nanoscale patterns have applicability in controlling optical properties of surfaces, in creating porous media such as chromatographic columns, and in enhancing the protein or cell adsorption.

In a related embodiment of the present invention the height and aspect ratio of the periodic nanostructures is mainly controlled by the bias voltage, and by the reactor wall material. When the bias voltage is changed from 0 to higher values (but is usually kept below 100V) the height of the nanostructures increases. However periodicity may or may not be preserved depending on the plasma reactor wall material, and the reactor design which may allow more or less wall material sputtering. Reactor wall material is always sputtered on the etched polymer surface. If such material is metallic or inorganic such as $Al_2O_3$ it cannot be etched by $O_2$ or $SF_6$ plasmas and creates etch inhibitors. These inhibitors deposit randomly on the etched surface and locally prevent etching leading to random nanocolumns, growing in parallel with the periodic mounds thus disturbing periodicity. Thus in most commercial reactors which have metallic walls and inorganic $Al_2O_3$ parts periodicity will be observed at 0 or very low bias and short processing times.

In a related embodiment this invention also provides methods to control the height of the periodic nanostructures. Accordingly, there is provided a method for controlling the height of nanostructures fabricated on a polymeric surface, which method comprises providing a polymeric surface in accordance with the main aspect of the invention and effecting plasma treatment under different bias voltage in a plasma reactor having walls covered with polymeric material or other etchable material which does not cause sputtering of etch inhibitors, whereupon an increase of nanostructure height is observed as bias voltage increases. These highly periodic nanostructures are usually of LAR.

Since the key issue for controlling the height and periodicity is the kind (organic or inorganic) and the amount of sputtering of wall or electrode material, provision of an extra electrode surface (target) which is intentionally inserted in the plasma reactor, is covered with the appropriate material (organic or metallic or inorganic) and is separately biased to provide controlled sputtering of inhibitors is also a related preferred embodiment of the present invention.

In a related embodiment this invention also provides methods to control the transition from highly periodic LAR nanostructures to less periodic or stochastic HAR-HSA nanostructures. Accordingly, there is provided a method for controlling the periodicity and morphology of nanostructures fabricated on a polymeric surface, which method comprises providing a polymeric surface in accordance with the main aspect of the invention and effecting plasma treatment under a different bias voltage and/or enhanced processing time in a plasma reactor having metallic and inorganic walls such as $Al_2O_3$, $SiO_2$ etc., whereupon a resulting transition to a columnar-like surface, less periodic or stochastic high aspect ratio (HAR-HSA) nanostructure is observed.

The invention also presents methods to control the periodicity and geometrical characteristics of the fabricated highly periodic, LAR nanostructures, as well as the periodicity and the geometrical characteristic of less periodic HAR-HSA nanostructures.

In a related embodiment the invention also describes methods to control the morphology from mound-like to ripple-like periodic nanostructures. Accordingly, there is provided a method for controlling the periodicity and morphology of nanostructures fabricated on a polymeric surface, which method comprises providing a polymeric surface in accordance with any of the methods of the main aspect of the invention and effecting plasma treatment at a temperature in excess of the glass transition temperature of the polymer ($T_g$); wherein a ripple-like morphology is observed instead of a mound-like morphology. Using graphoepitaxy these ripples may be converted to parallel lines.

Such highly periodic controlled AR structures are also shown to be valuable to control the reflectivity of surfaces and to tune it to the appropriate broadband or peaked reflector. Accordingly, in a related embodiment, the invention provides a method for the fabrication of nanostructures on polymeric surfaces by means of plasma processing and wherein the resulting polymeric surfaces have enhanced antireflective performance, which method comprises providing a polymeric surface comprising nanostructures and fabricated in accordance with any of the methods of the main aspect of the invention, wherein, during the plasma treatment step of any of the methods of the main aspect, fast etching plasmas are utilised with ions having energy less than or equal to 100 eV. In accordance with this main embodiment, a bias voltage of less than or equal to 100V may be applied during the plasma treatment step.

As such, a method is provided of fabricating grading index polymeric surfaces delivering enhanced antireflective performance, or tuned reflectance in a specific band, by utilizing fast etching plasmas with ions having energy less or equal to 100 eV to avoid sample heating.

In addition coating such periodic mounds with thin metal layer, or transferring the pattern to a thin metal layer so as to create metal nanoholes, or nanodots greatly affects the optical properties of this metal film due to surface Plasmon resonance effects. Creation of such structures is a problem, and our method provides an easy way to nanostructure thin metal films.

In the context of the present specification "mound-like periodicity" is intended to encompass columnar-like structures periodically arranged on a surface. This is to be distinguished from "ripple-like periodicity", which is intended to encompass structures arranged in substantially parallel lines.

Features of the above-described embodiments and aspects of the invention may be combined in any permutation.

DETAILED DESCRIPTION OF THE PREFERRED EMBODIMENTS

The main aspect of the present invention provides a method of fabricating spontaneously formed, self-organized, highly periodic nanostructures with controlled geometrical characteristics and Aspect ratio on polymer/plastic surfaces by means of plasma etching techniques. Of particular advantage is the fact that the methods described are generic and applicable to any homogeneous organic or inorganic polymer. Particularly preferred organic polymers are Poly Methyl Methacrylate (PMMA), Poly Ethylene Terepthalate (PET), Poly Ether Ether Ketone (PEEK), or PS or PE or COC, and particularly preferred inorganic polymers are Poly Dimethyl Siloxane (PDMS), and acrylic Silicon Containing polymers such as ORMOCER (a registered Tradename). The polymer may be provided, for example, in the form of a plate or a film.

A particularly advantageous feature of the main aspect of the present invention is the possibility to use a novel, dry, flexible, very fast and easy to implement technique for fabricating surfaces of spatially controlled, periodically nanostructured mound-like surfaces. It is highly significant that the possibility exists of obtaining these surfaces without having to perform a specific pre-treatment step on the homogeneous organic or inorganic polymer prior to plasma treatment. An optional polymer cleaning step is not considered an example of a specific "pre-treatment", as that term is defined throughout the present specification.

The gas environment used in the method of the main aspect of the present invention is preferably based on either oxygen plasma treatment of the polymer, or $SF_6$ plasma treatment; however, a mixture of oxygen and $SF_6$ may also be used, or mixtures with noble gases, or other etching gases and noble gases. Where pure gas plasma environments are used, the gas is typically present at 10 to 1000 sccm, preferably 50 to 300 sccm and more preferably 50 to 150 sccm. Where the polymer is exposed to a plasma treatment employing a mixture of oxygen ($O_2$) and sulphur dioxide ($SF_6$), the percentage of gas flow of sulphur dioxide ($SF_6$) is typically in the range of from 5 to 75%, preferably 7 to 50%, and more preferably 10 to 30%.

The height and the aspect ratio of the nanostructures and their periodicity is strongly influenced by the bias voltage, the plasma-source inorganic-wall sputtering due to capacitive coupling, and the plasma reactor wall material. When metallic and/or inorganic (such as Al2O3) wall materials are used and capacitive coupling exists periodicity is present only for small bias voltages below 20 V and preferably 0 V. Higher voltages and/or increased capacitive coupling result to wall sputtering material causing local etch inhibition, and growth of random nanocolumns, disturbing periodicity. The height of the 0 V bias appearing nano-mounds is below 100 nm, and their aspect ratio is below 3 (LAR).

In yet another embodiment of the invention higher (taller) nanostructures may be obtained with aspect ratio below 3 (LAR) when the bias voltage is between 20-100 V, and preferably between 60-100V, and the wall material is etchable by the gas plasma used. Preferable etchable wall materials are polymers, which could be coated on the interior of the reactor, or any other material which would not cause sputtering of etch inhibitors on the surface, for the particular gas used. When a voltage of 100 V is applied a few 100 nm high nano-mounds are obtained.

The geometrical characteristics of the periodic nanostructures obtained at any bias voltage are thus summarized below: Statistical analysis of the resulting nanostructures obtained with 0 bias has revealed that, even without pre-treatment such as graphoepitaxy, the method of the present invention provides periodic structures where the inverse of the FWHM of the FFT is greater than the wavelength, and more preferably two to three times larger than the wavelength, and the Height-Height Correlation Function (HHCF) of the surface of the nanostructure, G(r), shows a series of well defined oscillations and, specifically, shows at least one periodic maximum and minimum, and preferably three or more maxima and minima. The mound-like surface of uniformly spaced and sized protrusions typically comprises protrusions with a height in excess of 50 nm, preferably in excess of 80 nm, and more preferably in excess of 100 nm, and aspect ratio less than 3. Scaling analysis of the nanostructures has determined that typically average widths (2.4) of the protrusions of the nanostructures achievable is in the range of from 20 to 200 nm, preferably 30 to 150 nm, and more preferably 40 to 100 nm.

In yet a further embodiment of the invention a method is provided for controlling the transition from the LAR highly periodic structures to HAR-HSA less periodic or stochastic structures, by means of electrode bias voltage, and unetchable, easily sputtered, reactor wall material. In particular it has been shown that having a bias voltage larger than 20 V, and preferably larger than 60 V, and lower than 100 V in the plasma reactor, and having a $Al_2O_3$ upper part and anodized Al walls results in a transition from a periodic mound-like surface to a less periodic or stochastic columnar-like surface, showing high aspect ratio (HAR) nanostructures.

In yet another analogous embodiment of the invention an extra electrode surface (target) is intentionally inserted in the plasma reactor, is covered with the appropriate material (organic or metallic or inorganic) and is separately biased to provide controlled sputtering of inhibitors. Depending on the target area, material, and bias voltage LAR or HAR-HSA periodic nanostructures, as well as HAR-HSA stochastic nanostructures will result. This embodiment is particularly useful when capacitive coupling and thus sputtering of the reactor walls is minimized and therefore an external source of inhibitors is needed to control the nanostructure formation.

The geometrical characteristics of the periodic or stochastic nanostructures obtained in accordance with the method of the main aspect of the invention are influenced by plasma processing conditions, for example gas chemistry, electrode temperature, pressure, processing time, the polymer physical properties such as molecular weight, glass transition temperature, degree of cross-linking and polymer film or polymer substrate formation method. Typically, in accordance with the method that is the main aspect of the present invention, during the plasma treatment, the electrode temperature for nano mound formation will be in the range of from 20 to 70 degrees Celsius below the glass transition temperature Tg of the polymer, and preferably of from 30 to 60 degrees Celsius below the glass transition temperature Tg of the polymer. The polymer will be exposed to the plasma treatment for a time in the range of from 30 seconds to 30 minutes, preferably 1 to 20 minutes, more preferably 1 to 15 minutes and more preferably still from 1 to 5 minutes. Typically the plasma reactor chamber is set in a range of pressure from 0.20 to 15 Pa, preferably 0.50 to 2 Pa.

Advantageously, the method of the main aspect of the invention is applicable for large surfaces and the wavelength of the periodicity varies within a narrow range, even in the absence of the preferred graphoepitaxy pre-treatment step. In accordance with a preferred embodiment, resulting nanostructures may have a mound-like surface of uniformly spaced and sized protrusions which have an aspect ratio of less than 3.

In accordance with a preferred embodiment of the main aspect of the present invention, the use of graphoepitaxy prior to the plasma treatment step offers the possibility of even greater confinement of the geometry of the resulting nanostructures. For example, scaling analysis of the resulting nanostructures reveals that the inverse FWHM (system correlation length) is 2 to 4 times larger than the wavelength of the periodic structures.

In a related embodiment to the main aspect of the present invention a method is provided for transferring the pattern fabricated on polymers to an underlying material (substrate), or to another surface. The transfer is achievable, via, for example, contact printing, hot embossing, plasma etching and/or related techniques that are known to those skilled in the field. Structures made from such techniques may find application in nanoelectronics, nanophotonics, high density storage media, magnetic media, nanowire growth, surface reflectivity tuning, or in biological and biochemical fields such as biosensors, bioassays, and nano-scaffolds for cell and protein anchoring. In accordance with a preferred embodiment of this aspect of the invention, the nanoscale pattern transfer is effected on another surface by means of a technique selected from the group consisting of anisotropic etching with the pattern acting as in situ mask; contact printing; soft lithography; electrodeposition; metallization and lift off. In accordance with a particularly preferred embodiment the other surface is an etchable hard substrate and the pattern transfer is carried out by means of anisotropic plasma etching.

In another preferred embodiment of the present invention highly periodic HAR-HSA structures may also be obtained. The high aspect ratio (HAR-HSA) highly periodic structures may, for example, be obtainable by first starting with highly periodic LAR structures on a silicon containing polymer, and then pattern transferring the shape on the polymer with an oxygen plasma to an underlying organic polymer. Such HAR-HSA structures lead to the fabrication of porous media which have applications in chromatographic columns used for chemical and biochemical analysis, as well as any application requiring high surface area structures, such as catalysis, new nanostructured electrodes for batteries, sensor surfaces etc.

In accordance with a related embodiment to the main aspect of the present invention, a method is provided which facilitates the transfer from mound-like surfaces to ripple-like surfaces by changing the temperature of the sample in relation to its glass transition temperature ($T_g$). Accordingly, a method is provided in which the periodicity and morphology of nanostructures fabricated on a polymeric surface may be controlled. The method comprises providing a polymeric surface and effecting exposure of the polymer to an etching plasma such as oxygen ($O_2$) or sulphur hexafluoride ($SF_6$) plasma treatment or a plasma treatment employing a mixture of oxygen ($O_2$) and sulphur hexafluoride ($SF_6$) at a temperature in excess of the glass transition temperature of the polymer ($T_g$), wherein a resulting ripple-like morphology is observed. Using graphoepitaxy this ripple morphology may be aligned producing parallel lines.

Devices obtainable from the method of this aspect may have particular application in the fabrication of a nano-scaffold to which proteins or cells may be anchored and/or wherein the device has application in nano-bioassays.

In accordance with a related embodiment of the main aspect of the invention, metallic surfaces of tuned reflectance may be provided, due to the degree of periodicity achievable in the nanopatterns. As such a method is provided for the fabrication of nanostructures on polymeric surfaces by means of plasma processing and wherein the resulting polymeric surfaces have enhanced antireflective performance. The method comprises providing a polymeric surface comprising nanostructures and fabricated in accordance with any of the main aspects of the present invention, wherein fast etching plasmas are utilised with ions having energy less than or equal to 100 eV. This may be achieved by using a bias voltage of less than or equal to 100V. An antireflective, yet optically transparent surface is obtainable.

No doubt many other effective alternatives will occur to the skilled person. It will be understood that the invention is not limited to the described embodiments and encompasses modifications apparent to those skilled in the art lying within the spirit and scope of the claims appended hereto.

EXAMPLES

Preferred embodiments of the invention are presented in the following examples:

Example 1

Highly Periodic Pattern Formation on PMMA Plates by Oxygen Plasma Treatment at 0 V Bias PMMA in a 2 mm thick sheet-form (purchased from IRPEN, Spain) is used as delivered (with only a few seconds cleaning with isopropanol) with no other special pre-treatment. A plasma reactor (MET-Alcatel), equipped with a helicon source (at 13.56 MHz), providing RF top-power 2000 W is used, to provide high neutral and ion flux. The electrode is not externally biased, and is set at 50° C. The chamber is fed with 100 sccm $O_2$ and set at 0.75 Pa. The chamber walls are made of Anodized Al, and the plasma source wall from Al2O3. It is clarified that this particular reactor does not have an electrostatic shield for the RF fields of the helicon source antenna, and as a result source wall material is sputtered due to high capacitive voltages developing in the source.

FIG. 1 demonstrates three different magnification Atomic Force Microscopy (AFM) images of the same PMMA sheet surface after 5 min Oxygen plasma processing, at the aforementioned process parameters. What is observed in the 10×10 $um^2$ magnification is a macroscopically homogeneous nanostructured surface covering the 100% of the measured area. Based on AFM imaging survey around the plasma treated sheet (approx. 2×2 $cm^2$) we concluded that this homogeneity extends limitlessly. Zooming in to 1×1 $um^2$ and more, down to 300×300 $nm^2$ the precise morphology of the plasma treated surface is unveiled; a mound-like surface of uniformly spaced and sized protrusions of ~35 nm height (RMS=8.6 nm). Scaling analysis of FIG. 1 provides information on the correlation length ($\xi$=14 nm), the average spacing (wavelength) (L=55 nm) designated as the $1^{st}$ minimum in G(r), and width (W=2$\xi$=28 nm) of the protrusions. The periodic state of the surface is revealed by the existence of distinct minima of the G(r) function; one at 55 and one at 107 nm and a weak one at ~150 nm. Evident periodicity appears again after ~350 nm. The intense peak of F(k) function at 0.018 $nm^{-1}$ (=1/55 nm) is in accordance with the G(r)-based results. These results suggest that under the proposed process parameters, spontaneous formed, self-organized, periodic nano-texturing is produced, with no special pre-treatment. This is the first demonstration of plasma-directed self-assembly. Even better control of the periodicity was obtained using graphoepitaxy.

Example 2

Effect of Processing Time on Geometrical Characteristics of Highly-Periodic Patterns PMMA plates were treated as described in example 1 for 3 and 5 min. Scaling analysis showed the following results:

| Conditions | RMS in nm | Average width (2·$\xi$) in nm | Average spacing in nm, wavelength |
|---|---|---|---|
| 3 min, 50° C. | 4.9 | 16 | 27.5 |
| 5 min, 50° C. | 8.6 | 28 | 55 |
| 15 min, 50° C. | 25 | | |

As time proceeds the periodic mounds grow higher, wider, and with a larger spacing. The periodicity persists for several minutes of processing, but is lost at long processing times (15 min in this example).

Example 3

Effect of Sample Temperature on Geometrical Characteristics of Highly-Periodic Patterns PMMA samples were treated as described in example 1, but the temperature was kept higher 75° C. Scaling analysis results are shown below and compared with example 1.

| Conditions | RMS in nm | Average width (2·$\xi$) in nm | Average spacing in nm, wavelength |
|---|---|---|---|
| 3 min, 50° C. | 4.9 | 16 | 27.5 |
| 5 min, 75° C. | 10.23 | 62 | 116 |

As can be seen, increasing the temperature the height, width, and spacing between nanostructures are increased.

Example 4

Effect of Bias Voltage on Periodic Pattern Geometrical Characteristics on PMMA Plates Using Etchable Walls The experiment described in example 1 was repeated this time varying bias voltage from 0 to −100V, and covering the reactor walls and dome, as well as the electrode with photoresist polymer using a brush to affect coating. The reactor walls are thus etchable in the O2 plasma and do not produce etch inhibitors which could land on the surface of the etched PMMA plate. Highly periodic nanomounds were produced for 0 bias voltage analogous to example 1 (these are shown in FIG. 2a). Highly periodic nanomounds were produced for −100V bias as FIG. 2b shows. The nanomounds at −100V are taller and wider, despite the fact that processing time was only 1 min, and the temperature was lower compared to 0 V. The following table summarizes the results of the statistical and scaling analysis:

| Conditions (reactor wall covered with etchable material) | RMS in nm | Average width (2·ξ) in nm | Average spacing in nm, wavelength |
|---|---|---|---|
| 2 min, 0 V bias, 50 C. | 8.9 | 23.5 | 45 |
| 1 min, −100 V bias, 10 C. | 26 | 100 | 174 |

Thus, for 0V bias periodic structures do form whatever the plasma reactor wall material. However, as will be shown in examples 10, 11, 12 below, periodic structures at −100 V bias do NOT form when the electrode material is metallic or metallic oxide, which is the usual case in commercial reactors.

Example 5

Highly Periodic Pattern Formation on PMMA FILMS by Oxygen Plasma

In another preferred embodiment of the present invention, spin-coated PMMA films are plasma treated. In this case PMMA ($M_n$=120k) in powder-form (purchased from Aldrich Chemical Company), was dissolved in Propylene-glycol-monomethyl-ester-acetate (PGMEA) or other appropriate solvent, spin-coated on Si, followed by post-apply annealing for 30 min at 160° C. in an oven. It was then plasma treated as described in example 1, but for 40 sec. In this case the ξ, L and W become 17.5, 62.5 and 35 nm respectively.

Example 6

Periodic LAR Pattern Formation on PMMA Films Exposing an Underlying Substrate

In another preferred embodiment of the present invention, spin coated PMMA was utilized, and treated as described in example 5, but for 3 min, in order to unveil the substrate and result in a co-existence of both the periodic pattern and the substrate. In this case the ξ, L and W become 17, 59 and 34 nm respectively. Such patterns can be used for periodic pattern transfer to the underlying substrate as described in example 7.

Example 7

Highly Periodic Pattern Formation on an Etchable Hard Substrate

In another preferred embodiment of the present invention, patterns fabricated according to Example 1-6 are transferred onto the substrate by means of anisotropic plasma etching with the periodic pattern acting as in situ mask (fabricated according to example 8). To permit creation of tall nanostructures a thin sacrificial Silicon oxide, or nitride, or metal mask, or other hard mask, may be deposited first, the PMMA film is created on top of it, and the plasma directed self-assembly method described in examples 1-6 is applied. The periodic pattern is transferred to the hard mask via plasma etching, and then transferred to the substrate by another plasma etching step using the hard mask, and thus creating tall nanostructures on the substrate.

Example 8

Highly Periodic Structures on Other Polymers

The experiment described in example 1 was repeated on other polymers including PET, PEEK, PS (poly Styrene), PE (poly-ethylene). AFM analysis showed that these polymers also showed periodic structure formation.

Example 9

Comparison of Plasma Directed Vs Block Copolymer Self-Assembly

A typical example of a chemically-driven self-assembly based on diblock system (PMMA-PS i.e. Poly(methyl)methacrylate-poly(sterene)) is depicted in FIG. 3. Here the diblock system of PMMA-PS is shown in this AFM image after removal of the PMMA phase leading to a PS matrix with nanopores. Both the Height-Height Correlation function and the Fourier Transform clearly show the characteristic peak for the periodicity of the nano-wells, their periodicity being around 57 nm. The purpose of this example is to show that indeed the extent of organization and periodicity of our plasma directed self-assembly method is at least comparable to other established methods, and this is clearly seen by comparing FIGS. 1 and 2 with FIG. 3. It is maybe appropriate to emphasize that block-copolymer based self-assembly is a rather complex technique that requires special substrate pre-treatments, multi-processing steps and is very time consuming (typically 24-48 h). Our plasma directed self-assembly requires only a few minutes of very simple processing (spin coating and plasma etching).

Example 10

Transition from LAR Highly Periodic to HAR-HSA Less Periodic or Stochastic Nano-Structures Using Bias Voltage and Metallic/Inorganic Reactor Walls In a related embodiment of the present invention, electrode bias voltage is applied to control the transition from a LAR highly periodic morphology to high-aspect ratio less periodic or stochastic morphology. The conditions used in example 1 were applied, various polymer substrates were utilised including PMMA, PEEK, PET, PS, PE, and a bias voltage of 100 V was applied on the bottom electrode. HAR-HSA stochastic nanostructures were created with defined average (stochastic) height, width, and spacing, meaning that there is no distinct sharp peak in the Fourier Spectrum or oscillations in the height-height correlation function. This result shows that under high bias voltage conditions and with unetchable, easily sputtered walls, etch inhibitors lead to HAR-HSA stochastic nanostructures masking the periodicity.

Example 11

Control of the Geometrical Characteristics of Periodic or Stochastic Nanostructures by Polymer Molecular Weight In another preferred embodiment of the present invention, the spatial characteristics of the patterns fabricated according to Examples 1-10, on spin coated PMMA surfaces prepared as in example 5, are controlled by means of polymer molecular weight (see FIG. 4). Increasing the MW increases the height, width and spacing of the mounds or columns for the same processing time.

Example 12

Control of the Geometrical Characteristics of Periodic or Stochastic Nanostructures by Electrode (i.e. Sample) Temperature and Transition from Nanomounds to Nanoripples FIG. 5 shows the variation of the morphology and height of a PMMA treated plate in Oxygen plasma for various electrode temperatures, under conditions used in example 11. We note that below the glass transition temperature of the plate Tg (~118° C.) the nanostructres are columnar-like, their height, width and density varying with electrode temperature. Above the Tg ripple-like nanolines are formed. This result shows that under graphoepitaxy conditions, and under higher than the Tg temperatures nanolines will also be formed with direction specified by the graphoepitaxy, for any polymer. Finally note in FIG. 5 that the RMS reaches a minimum plateau as the Tg is approached.

Example 13

Control of the Geometrical Characteristics of Periodic or Stochastic Nanostructures by Gas Mixture In another example of the preferred embodiment the gas mixture is changed from pure Oxygen to Oxygen and Sulphur Hexafluoride mixture and PMMA plates are etched. FIG. 6 shows the AFM images after 1 min etching in various mixtures O2/SF6 (0, 11, 25 και 65% in SF6 as percentage of gas flow). It is clearly seen that the morphology and RMS height of the nanostructures are affected, and show a minimum for 11% SF6 (RMS ~28.4 nm versus ~55 nm for pure Oxygen and ~41.8 nm for SF6 25%). This reduction of RMS at 11% SF6 is NOT accompanied by a reduced etch rate, while for SF6 content larger than 25% the RMS reduction is accompanied by ER reduction. Thus, this mixture is appropriate for minimizing the height of the nanostructures if this is desired.

Example 14

Creation of Periodic Nanostructures on PDMS and ORMOCER by SF6 Plasma

Examples 1-16 pertain to organic polymers such as PMMA. However, inorganic polymers may also be treated, such as PDMS and ORMOCER with SF6 plasmas. LAR highly periodic structures, as well as HAR-HSA less periodic structures may be formed. Thus in another preferred embodiment we prepare PDMS films by spin coating of the polymer and curing agent mixture on a substrate surface and subsequent thermal curing to result in 2 μm-2 mm-thick films. Various solvents may be used for spin-coating. In this example MIBK was used. We also prepared spin-coated ORMOCER films. These films are then exposed to SF6 plasma treatment, in an inductively coupled plasma (ICP) reactor (pressure of 10 mTorr, plasma power 1900 W, varying bias voltage). Processing time, bias, wall material and sample temperature control the height, width, spacing and periodicity of the nanostructures. FIG. 7 shows PDMS low periodicity (broad FFT spectrum) nanostructures obtained after 2 min etching with bias in SF6 gas in a reactor having metallic and Al$_2$O$_3$ walls. When the reactor walls were covered with an organic polymer film, very smooth surfaces resulted showing that in this case the role of sputtered inhibitor is very strong in the formation of HAR-HSA structures.

Example 15

Control of the Reflection Properties of Polymer Substrates

In another embodiment of the present invention the reflectance characteristics of polymer surfaces are controlled using plasma processes. In FIG. 8(a) we present the transmission and reflection spectrum of PMMA substrates before and after 1, 2 and 3 min of plasma processing, under using −100V bias as in example 11. The non-processed sample shows ~9% reflectance at 6o angle of incidence, which gradually decreases to ~7% after 1 and 2 min of Oxygen plasma processing on ONE side, while the transmittance of the sample increases (see FIG. 8d). More reduction of reflectivity may be achieved by processing both sides of the sample. Analogous results may be obtained by using zero bias conditions as shown in FIG. 8c, but for longer times (when the structures are less-periodic). Similarly to PMMA, reflectance spectra are shown for PDMS coatings in FIG. 8(b), before and after various SF6 plasma treatments. For 4-minute SF6 plasma treatment under conditions explained in example 14, reflectance has been decreased to 3.5%. As for the case of PMMA, SF6-treated PDMS surfaces are antireflective. These results suggest an alternative approach to fabricate antireflective coatings: Tuning of the height, width, and separation of the columns as described in examples 1-14 above permits tuning of the reflectivity in a broadband range by using less-periodic structures. At the same time the transmittance of the sample is increased. There is NO need to have bias voltages larger than 100V in order to tune the reflectance.

Example 16

Reflection from Au Coated Nanostructures

PMMA substrates and PMMA films on hard substrates were treated as described in examples 1 to 7. A thin Au layer of 20 nm was formed on the substrates. Some samples were left as coated, in others a lift off process was done to selectively remove Au from some areas. The transmition spectrum was examined in all samples and showed peaks due to the presence of the periodic nanostructures creating surface Plasmon resonances.

Example 17

Creation of HAR-HSA Highly Periodic Nano-Structures on Polymers

In another description of the preferred embodiment a LAR periodic structure was first fabricated on a PDMS film on top of an organic polymer, by using an SF6 plasma under low bias voltage. This PDMS served as an in situ mask for the subsequent O$_2$ plasma etching of the organic polymer. Plasma etching under conditions creating HAR-HSA structures was initiated thus creating highly ordered HAR-HSA structures due to the pattern transfer of the periodic structures to the polymer. The process described in above was applied to create highly porous polymer or other substrate. Among other applications this porous medium when functionalized serves as a chromatographic column for chemical and/or biochemical analysis, or for cell growth.

Example 18

Effect of Electrostatic Shielding of the Plasma Source Fields

In another preferred embodiment of the present invention the experiment described in example 1 was repeated after shielding the RF fields of the antenna using an electrostatic Cu perforated shield. Due to minimal sputtering no periodic pattern formation was observed for the same processing time. This example highlights the important role of controlled sputtering of etch inhibitors

Example 19

Insertion of Extra Target Electrodes for Controlled Sputtering

In another preferred embodiment of the present invention the experiment described in example 18 was repeated after inserting a separate electrode surface covered with photoresist in the reactor. The bias voltage on the sample was 0V as in example 1 and 18. However, a few 10s of Volts biasing on the target was enough to induce periodic pattern formation on the etched sample. This example proves that a controlled sputtering of inhibitors (etchable or unetchable) is needed on the surface of the etched sample to induce periodic pattern formation.

BRIEF DESCRIPTION OF THE DRAWINGS

These and other aspects of the invention will now be further described, by way of example only, with reference to the accompanying figures in which:

FIG. 2. AFM images (2×2 um$^2$) of a processed PMMA sheet under Oxygen plasma discharge. Conditions: [0.75 Pa, 100 sccm $O_2$, 50° C., 2 min, 2000 W, plasma reactor walls, electrode and dome covered with a coated photoresist polymer] together with the respective HHCF G(r) and FFT function F(k).

REFERENCES

Figure 1A:
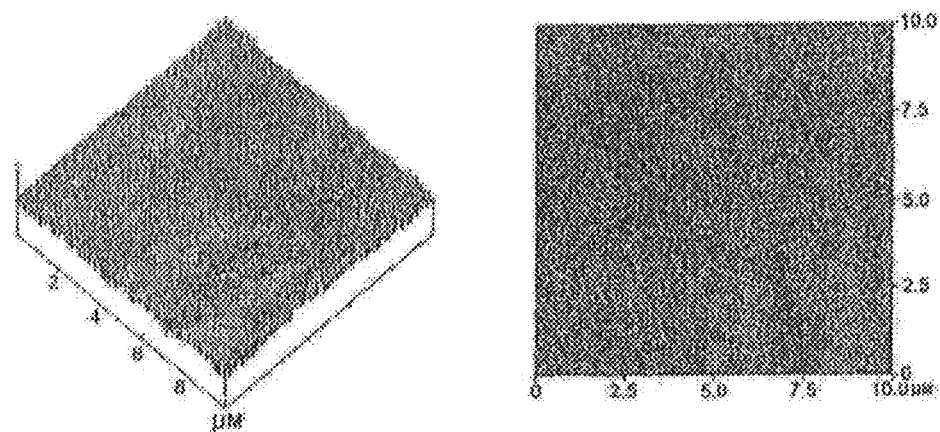
FIG. 1. Atomic Force Microscopy (AFM) images of a 5 min processed PMMA sheet under Oxygen plasma discharge. Three different magnification shots of the same surface are depicted: (a) 10×10 um$^2$ with RMS=10.7 nm, (b) 1×1 um$^2$ with RMS=8.6 nm and (c) 300×300 nm$^2$ with RMS=7.6 nm. Scaling analysis of FIG. 1d: Height-height correlation function HHCF G(r), and circularly averaged Fourier transformation FFT function F(k), showing oscillations and sharp peak respectively. Conditions: [0.75 Pa, 100 sccm $O_2$, 50° C., 5 min, 2000 W, 0 V, plasma reactor wall, electrode, dome are anodized aluminum and Alumina (Al2O3)].
Figure 1B:
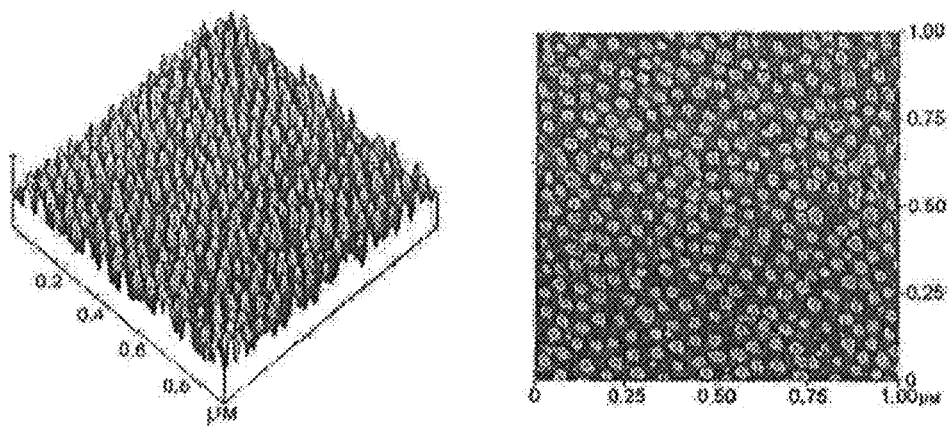
Figure 1C:
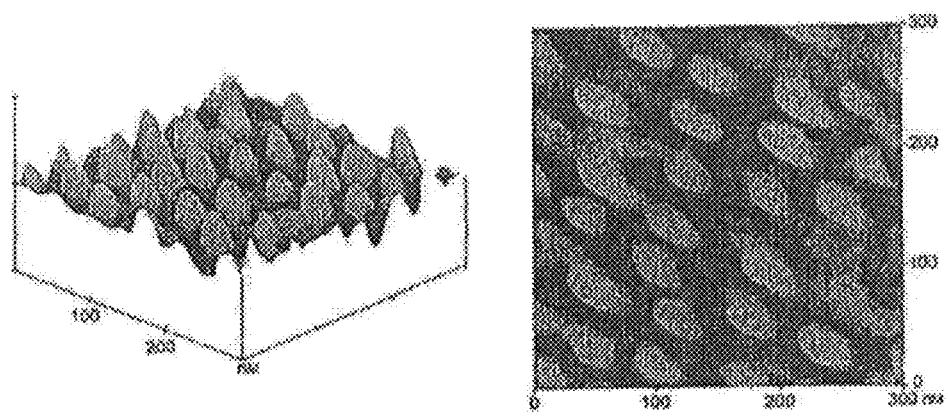
Figure 1D:
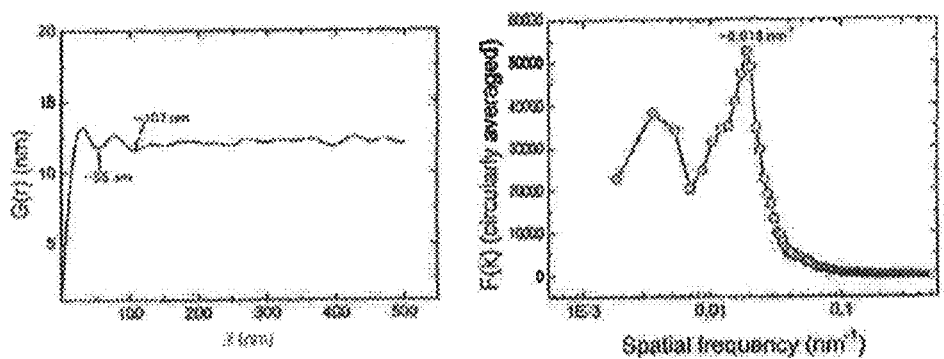
Figure 2A:
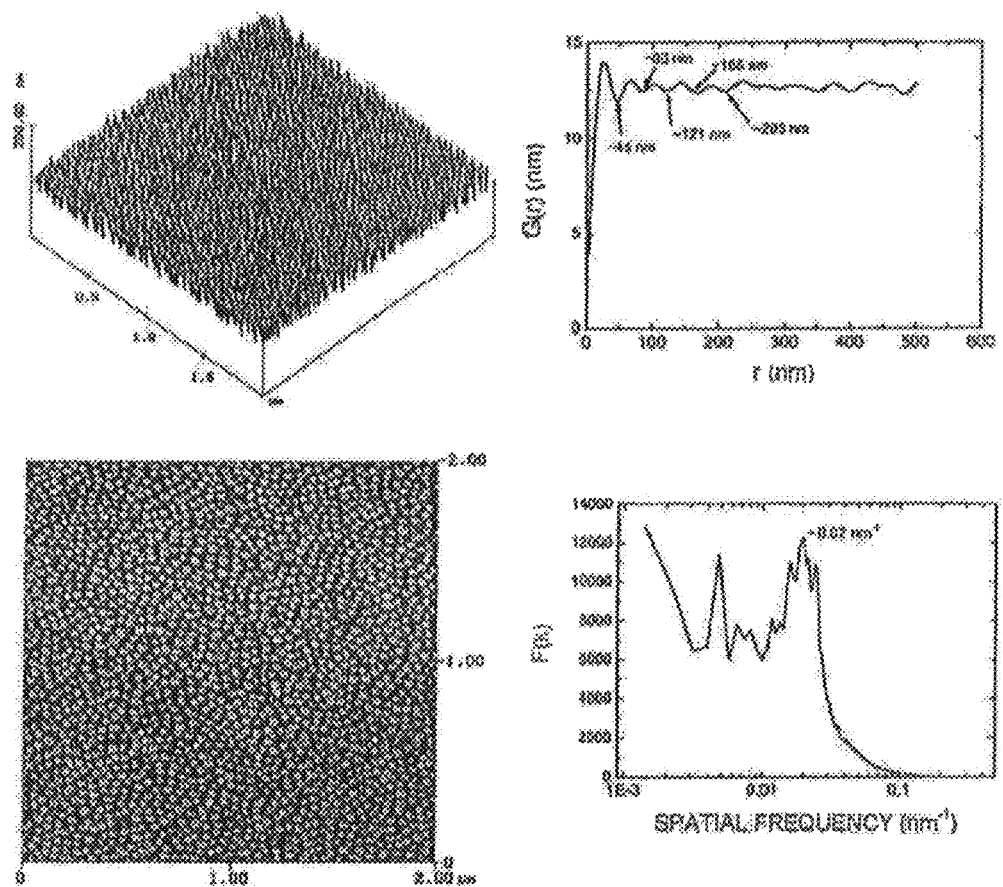
FIG. 2a is for 0 V bias and has a resolution of 512×512 points.
Figure 2B:
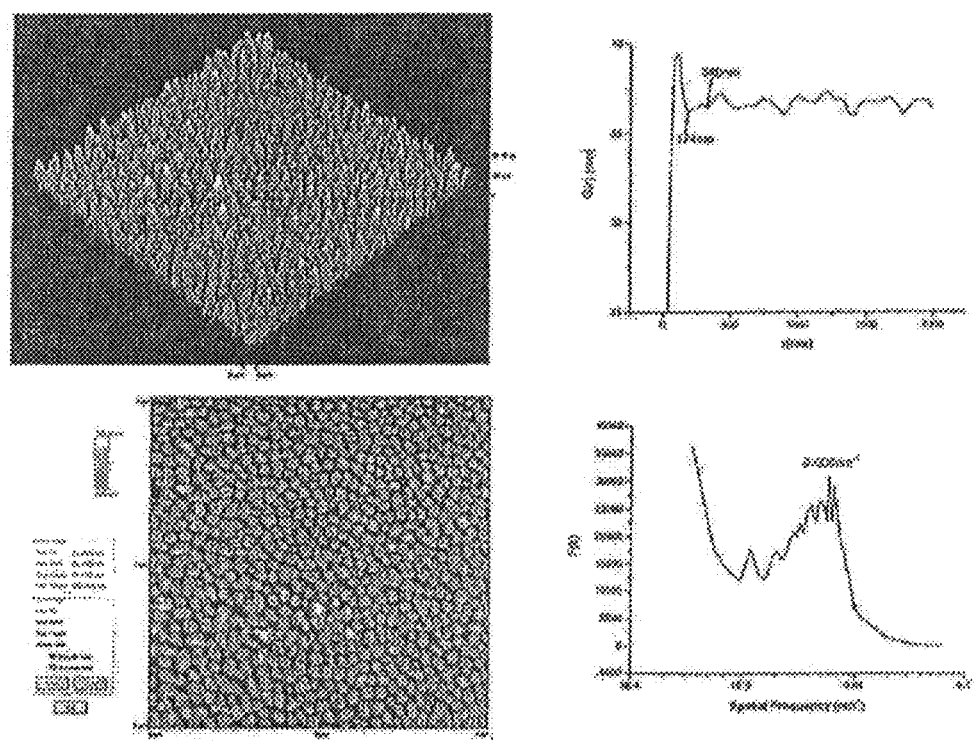
FIG. 2b is for −100 V bias and has a resolution of 256×256 points.
Figure 3:
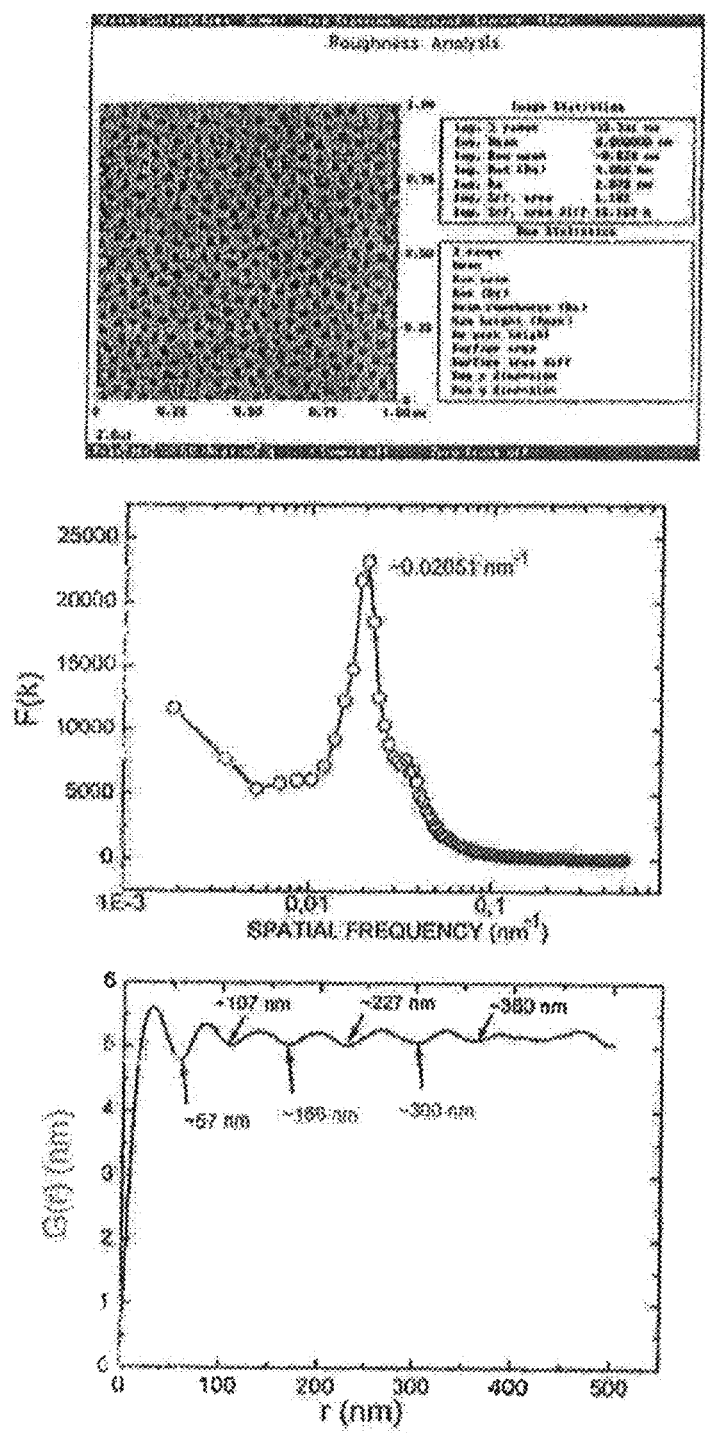
FIG. 3. AFM image of a 1×1 um$^2$ diblock copolymer pattern after Oxygen plasma etching and below, the respective FFT function F(k) and HHCF G(r).
Figure 4:
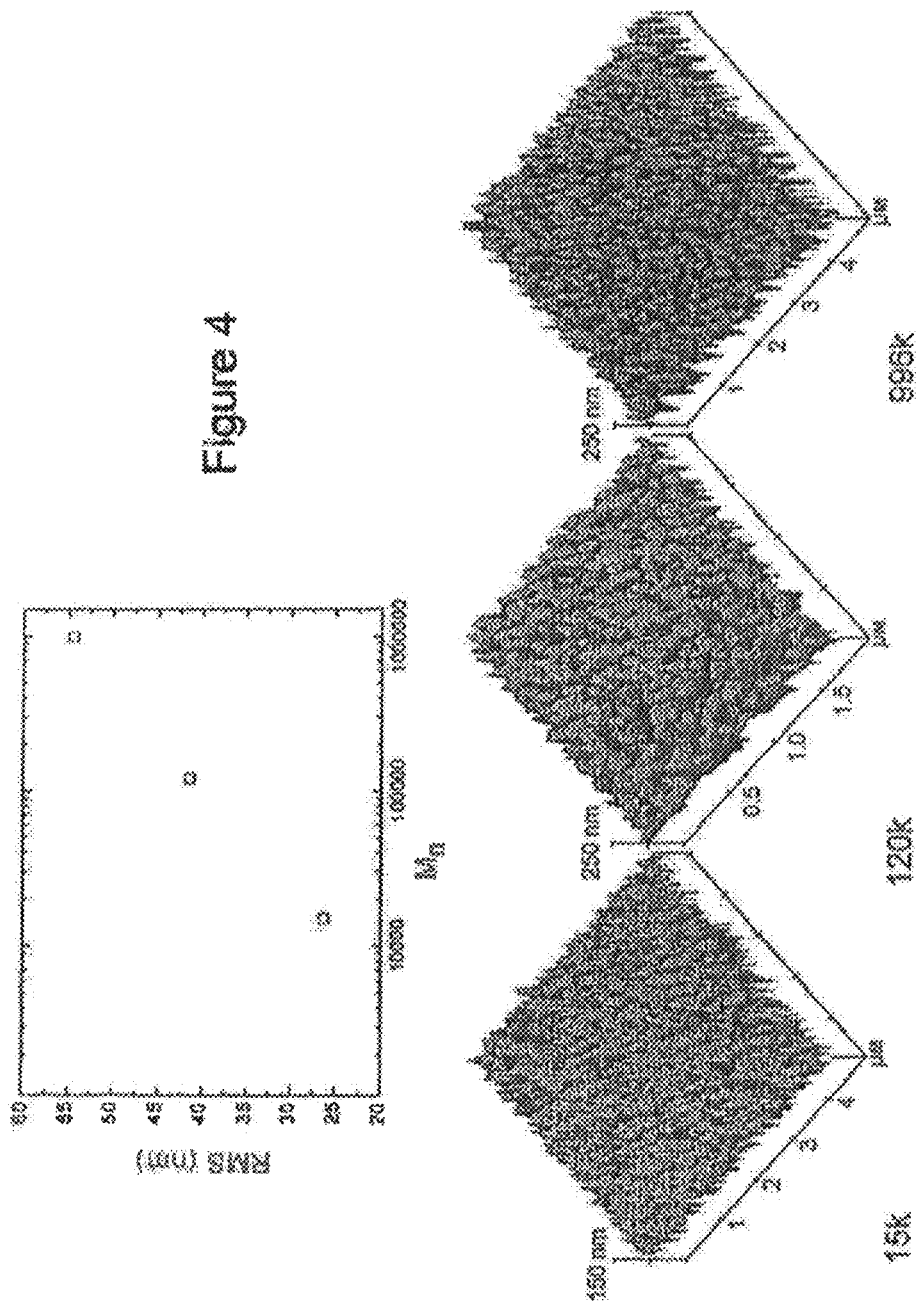
FIG. 4. Control of geometry with Molecular weight: RMS variation after 1 min of Oxygen plasma processed spin coated PMMA surfaces vs. Molecular weight Mn. Conditions: [2000 W, 100 sccm O2, −100 V bias, 15° C., 0.75 Pa plasma reactor wall, electrode, dome are anodized aluminum and Alumina (Al2O3)]. Below: The respective AFM images.
Figure 5:
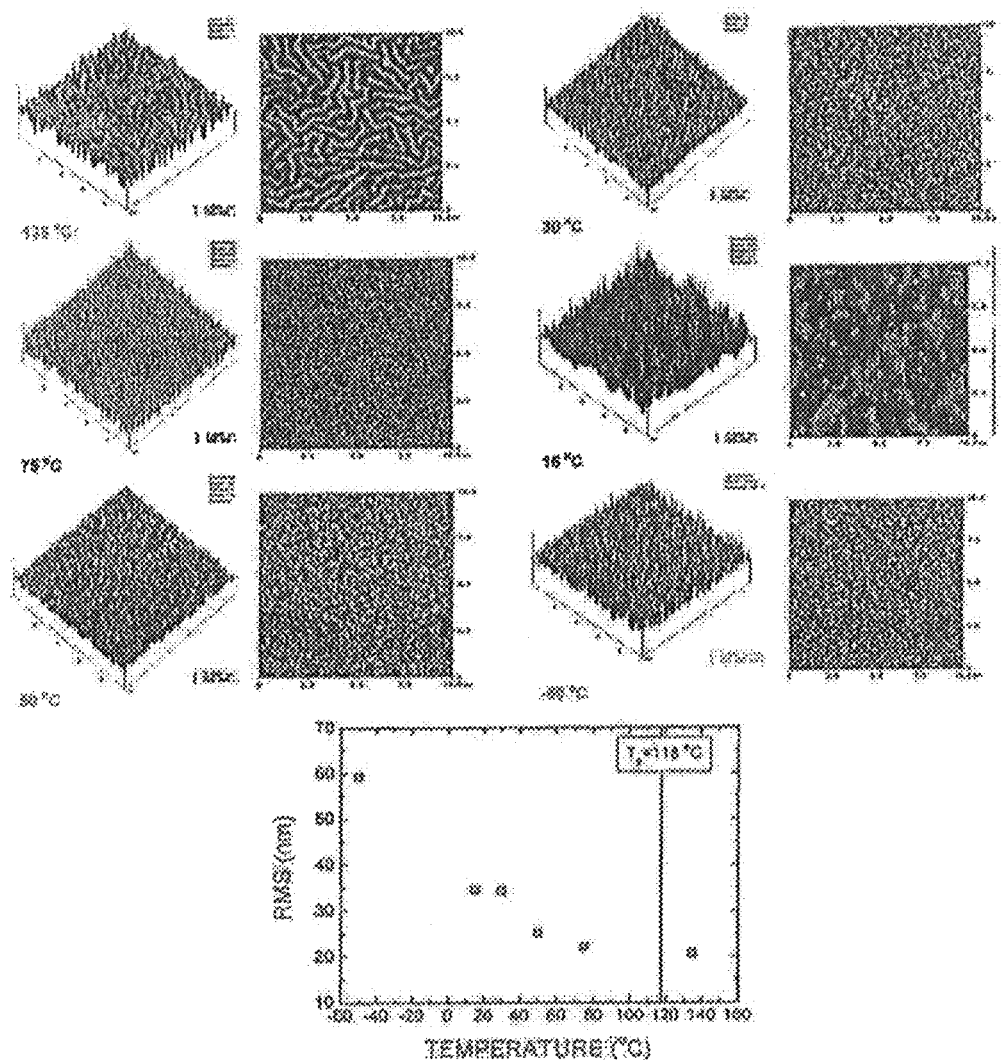
FIG. 5. Control of geometry with sample temperature: AFM images on the effect of Electrode Temperature (135° C., 75° C., 50° C., 30° C., 15° C., −50° C.) on the RMS height and morphology of nanostructures formed after 1 min of oxygen plasma etching of PMMA [conditions 0.75 Pa, 100 sccm O2, 1 min, −100 V bias, 2000 W, plasma reactor wall, electrode, dome are anodized aluminum and Alumina (Al2O3)]. Below: Variation of RMS versus Temperature for the AFM images shown in this figure.
Figure 6:
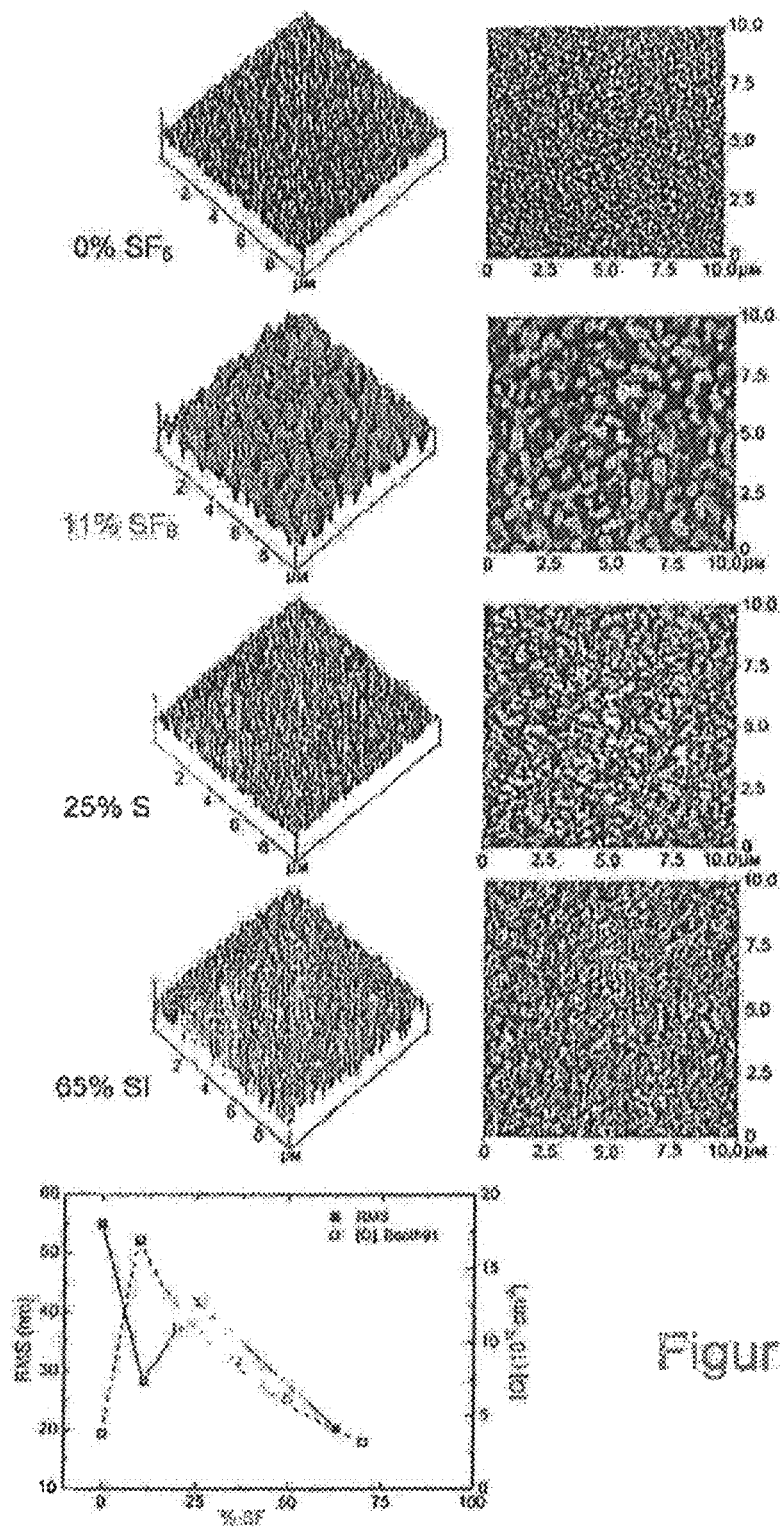
FIG. 6 Control of geometry with gas composition: AFM images of PMMA plates etched for 1 min in mixtures of Oxygen and Sulphur Hexafluoride plasmas. Conditions: [0.75 Pa, −100 V, 2000 W, 1 min, plasma reactor wall, electrode, dome are anodized aluminum and Alumina (Al2O3)]. Variation of RMS height of nanostructures versus $SF_6$ content in $O_2$ plasma. Below: Analysis of the AFM images, showing the RMS versus mixture content.
Figure 7A:
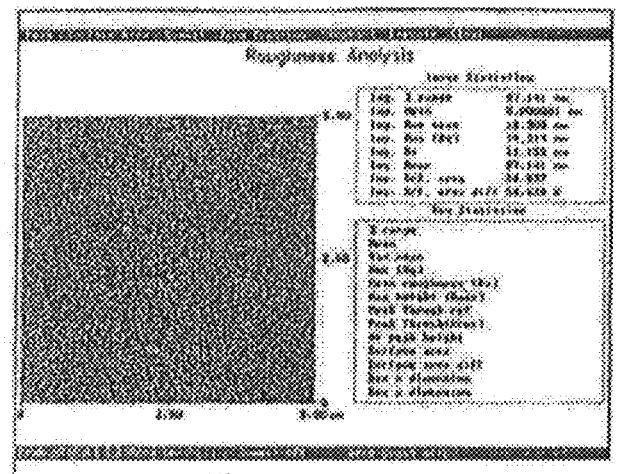
FIG. 7. Production of less periodic HAR-HSA nanostructures on PDMS after 2 min etching in SF6, −100 V bias, plasma reactor wall, electrode, dome are anodized aluminum and Alumina (Al2O3). The film was spin coated from MIBK. AFM image in (a), HHCF in (7b), FFT in (7c). In this example, where a high bias is used, the FFT peak is rather broad, indicating low periodicity.
Figure 7B:
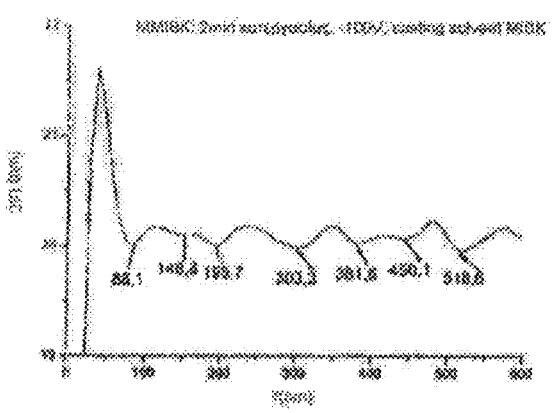
Figure 7C:
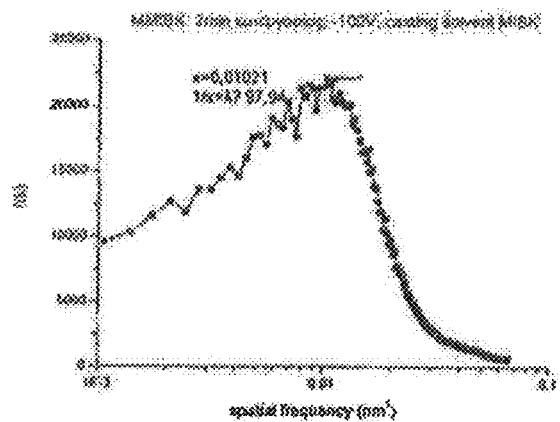
Figure 8A:
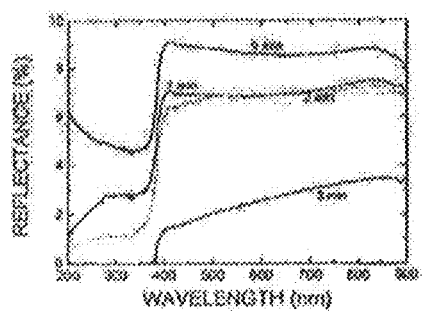
FIG. 8. Control of the reflectance properties of PMMA plate and PDMS films by plasma treatment using bias voltages less or equal to 100V; plasma reactor wall, electrode, dome are anodized aluminum and Alumina (Al2O3): (a) Reflectance spectrum of PMMA substrates before and after 1, 2 and 3 min of Oxygen plasma processing using −100V bias, (b) reflectance (at 6°) spectra of PDMS surfaces before and after 1, 3, 4, 6 min of $SF_6$ plasma processing using −100V bias, (c) Reflectance spectrum of PMMA substrate after 5, 10, 20 and 30 min of Oxygen plasma processing using 0V bias and (d) Transmittance of PMMA plates for which reflectance is shown in (a). Notice that transmittance increases for short treatment times.
Figure 8B:
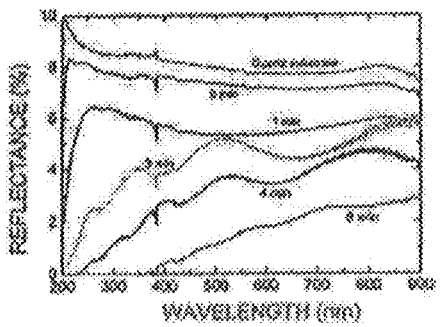
Figure 8C:
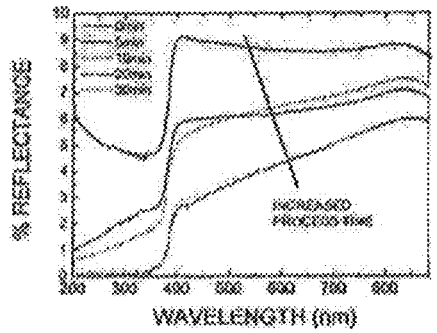
Figure 8D:
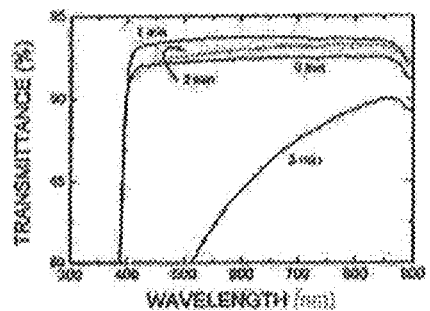

1. G. M. Whitesides et al, Science, 2002, 295, p. 2418.
2. G. M. Whitesides at al, Science, 1991, 254, p. 1312.
3. A. K. Boal, et al, Nature, 2000, 404, p. 746.
4. K. B. Blodgett et al, Physical Reviews, 1937, 51, p. 964.
5. J. C. Hutleen et al, J. Vacuum Science and Technology A, 1995, 13, p. 1553.
6. C. Park et al, Polymer, 2003, 44, p. 6725.
7. Y. Lei et al, Progress in Materials Science, 2007, 52, p. 465.
8. N. Bowden et al, Nature, 1998, 393, p. 146.
9. Z. Kollia et al, Applied Surface Science, 2005, 248, p. 248.
10. A. Anders, Surface & Coatings Technology, 2005, 200, p. 1893.
11. N. Bowden, et al, Applied Physics Letters, 1999, 75, p. 2557.
12. B. H. Diana et al, Applied Physics Letters, 2000, 76, p. 721.
13. A. Tserepi et al, J. Applied Physics, 2005, 98, p. 113502.
14. Y. Karade et al, Microelectronic Engineering, 2007, 84, p. 797.
15. N. Agarwal et al, Applied Physics Letters, 2001, 78, p. 2294.
16. S. K. Pani et al, J. Vacuum Science and Technology, 2006, 24, p. 163.
17. J. P. Youngblood et al, Macromolecules, 1999, 32, p. 6800.
18. K. Teshima et al, Applied Surface Science, 2003, 244, p. 619.
19. M. Lejeune et al, Langmuir, 2006, 22, p. 3057.
20. N. Vourdas et al, Nanotechnology, 2007, 18, p. 125304.
21. F. Walther et al, J. Micromechanics and Microengineering, 2007, 17, p. 524.X
22. A. Kaless et al, Surface & Coatings Technology, 2005, 200, p. 58.
23. Munzert, P., Uhlig, H., Scheler, M., Schulz, U., Kaiser, N. "Method for reducing boundary surface reflection of plastic substrates and substrate modified in such manner and use thereof", WIPO PCT publication WO04024805C1, 13 May 2004.
24. V. C. Rucker et al, Langmuir, 2005, 21, p. 7621.
25. N. Vourdas et al, Microelectronic Engineering, 2008.
26. WIPO PCT publication WO/2007/031,799.
27. R. Gago et al, Applied Physics Letters, 2006, 89, 233101.

28. T. Bobek et al, Physical Review B, 2003, 68, 085324.
29. F. Frost et al, Nuclear Instruments and Methods in Physics Research B, 2004, 216, p. 9.
30. B. Ziberi et al, Surface Science, 2006, 600, p. 3757.
31. J. Muñoz-Garcia et al, To appear in Lecture Notes on Nanoscale Science and Technology, edited by Z. Wang (Springer, Heidelberg).
32. T. W. Ebbesen et al, "Extraordinary optical transmission through sub-wavelength hole arrays," Nature 391, 667 (2005).
33. W. Dickson et al, Phys. Rev. B 76, 115411 (2007)

The invention claimed is:

1. A method for the fabrication of periodic nanostructures on polymeric surfaces by means of plasma processing, which method comprises the following steps:
    exposure of a polymer to an etching plasma, wherein said polymer is poly(methyl methacrylate) (PMMA) or poly (dimethyl siloxane) (PDMS) and wherein said etching plasma is oxygen ($O_2$) or sulphur hexafluoride ($SF_6$) or a mixture of oxygen ($O_2$) and sulphur hexafluoride ($SF_6$), or mixtures of etching gases with inert gas(es), wherein said inter gas(es) is/are Noble gas(es);
    wherein the conditions for exposure including plasma reactor wall material, intentionally inserted and biased target electrode, bias voltage, electrode temperature, processing time, pressure, and polymer physicochemical properties are selected appropriately to provide periodic nanostructures having a mound-like surface of uniformly spaced and sized protrusions wherein, upon statistical analysis of the nanostructures it is determined that the Height-Height Correlation Function (HHCF) of the surface of the nanostructure, G(r), shows at least one periodic maximum and one minimum, and the circularly averaged fast Fourier Transform (FFT) shows a distinct maximum
    wherein either PMMA plates are exposed to a plasma treatment of 100 sccm oxygen for 3 minutes at a reactor pressure of 0.75 Pa and a temperature of 50-70 degrees Celsius, or PDMS films are exposed to a plasma treatment of $SF_6$ for 2 minutes at a reactor pressure of 10 mTorr.

2. A method for the fabrication of periodic nanostructures of controlled geometrical characteristics on a polymeric surface of a polymer, wherein said polymer is poly(methyl methacrylate) (PMMA) or poly(dimethyl siloxane) (PDMS) by means of plasma processing, which method comprises the following steps:
    i) exposure of the polymer to an etching plasma wherein said etching plasma is oxygen ($O_2$) or sulphur hexafluoride ($SF_6$) or a mixture of oxygen ($O_2$) and sulphur hexafluoride ($SF_6$), or mixtures of etching gases with inert gas(es), wherein said inter gas(es) is/are Noble gas(es);
    ii) provision that the plasma reactor wall material, and/or dome, and/or electrode, and/or an intentionally inserted and biased target electrode are covered with etchable materials which do not create etch inhibitors as sputtered material, where such etchable wall materials may be polymeric materials
    iii) applying a bias voltage 0-100 V to the polymer sample and/or the target to provide periodic nanostructures having a mound-like surface of uniformly spaced and sized protrusions The height and diameter of these periodic nanostructures is increased as the bias voltage is increased Upon statistical analysis of the nanostructures it is determined that the Height-Height Correlation Function (HHCF) of the surface of the nanostructure, G(r), shows at least one periodic maximum and one minimum, and the circularly averaged fast Fourier Transform (FFT) shows a distinct maximum.

3. A method for the fabrication of nanostructures of controlled periodicity and Aspect Ratio on a polymeric surface of a polymer, wherein said polymer is poly(methyl methacrylate) (PMMA) or poly(dimethyl siloxane) (PDMS) by means of plasma processing, which method comprises the following steps:
    i) exposure of the polymer to an etching plasma wherein said etching plasma is oxygen ($O_2$) or sulphur hexafluoride ($SF_6$) or a mixture of oxygen ($O_2$) and sulphur hexafluoride ($SF_6$), or mixtures of etching gases with inert gas(es), wherein said inter gas(es) is/are Noble gas(es);
    ii) provision that the plasma reactor wall material, and/or dome, and/or electrode, and/or an intentionally inserted and biased target electrode are covered with un-etchable materials which create etch inhibitors as sputtered material, where such un-etchable wall materials could be metallic elements or oxides such as Al and AlO3
    iii) applying a bias voltage 0-100 V to the at least one of the polymer sample or the target to provide nanostructures having either a mound-like or a columnar form: For a given non-zero bias voltage of the target (if a target is inserted), if the polymer sample bias voltage is below 20 V, Low Aspect Ratio periodic nanomounds are formed; if the bias voltage is higher than 20 V, a transition to columnar-like less-periodic or stochastic High Aspect Ratio and High Surface Area nanostructures takes place; for the periodic nanomounds their statistical analysis shows that the Height-Height Correlation Function (HHCF) of the surface of the nanostructure, G(r), shows at least one periodic maximum and one minimum, and the circularly averaged fast Fourier Transform (FFT) shows a distinct maximum; for the columnar stochastic HAR-HSA structures no oscillations in the G(r) and only a broad or no peak in the FFT are observed.

4. A method for controlling the periodicity and morphology of nanostructures fabricated on a polymeric surface, which method comprises the following step
    (i) provision of a polymer, wherein said polymer is poly (methyl methacrylate) (PMMA) or poly(dimethyl siloxane) (PDMS);
    (ii) exposure of the polymer to an etching plasma wherein said etching plasma is oxygen ($O_2$) or sulphur hexafluoride ($SF_6$) or a mixture of oxygen ($O_2$) and sulphur hexafluoride ($SF_6$), or mixtures of etching gases with inert gases gas(es), wherein said inter gas(es) is are Noble gas(es) at a temperature in excess of the glass transition temperature of the polymer ($T_g$);
    wherein the etching plasma directs formation of a nanostructure on the polymer, and wherein ripple-like morphology is observed.

5. A method as claimed in any of claims 1 to 3, wherein, upon statistical analysis of the periodic nanomound nanostructures, it is determined that the inverse of the FWHM of the FFT is at least equal to the wavelength of the periodic structures.

6. A method as claimed in any one of claims 1 to 5, wherein, upon scaling analysis of the nanostructures, it is determined that the mound-like surface of uniformly spaced and sized protrusions comprises protrusions with a height in excess of 20 nm, preferably in excess of 50 nm, and more preferably in excess of 100 nm.

7. A method as claimed in any one of claims 1 to 6 wherein, upon scaling analysis of the nanostructures, it is determined that the average width (2·ξ) of the protrusions of the nanostructures is in the range of from 10 to 400 nm, preferably 40 to 150 nm, and more preferably 40 to 100 nm.

8. A method as claimed in any of claims 1 to 7, wherein the polymer is provided in the form of a plate or a film.

9. A method as claimed in any of claims 1 to 8, wherein the periodicity, the morphology and the geometrical characteristics of the nanostructures having a periodic mound-like or stochastic columnar-like morphology is dependent on polymer molecular weight and/or polymer chain conformation.

10. A method as claimed in any of claim 1 to 3, wherein, during the plasma treatment, the electrode temperature is in the range of from 20 to 70 degrees Celsius below the glass transition temperature Tg of the polymer.

11. A method as claimed in any of claim 1 to 3, wherein the polymer is exposed to the plasma treatment for a time in the range of from 30 seconds to 30 minutes.

12. A method as claimed in any of claim 1 to 3, wherein, during the plasma treatment, the plasma reactor chamber is set in a range of from 0.10 to 15 Pa.

13. A method as claimed in any of claim 1 to 3, wherein PMMA plates are exposed to a plasma treatment of 100 sccm oxygen for 3 minutes at a reactor pressure of 0.75 Pa and a temperature of 50-70 degrees Celsius.

14. A method as claimed in any of claim 1 to 3, wherein PDMS films are exposed to a plasma treatment of $SF_6$ for 2 minutes at a reactor pressure of 10 mTorr.

15. A method as claimed in any one of claims 1 to 8 or 9 to 4, wherein, prior to the plasma treatment step (ii) graphoepitaxy is performed to provide a lithographically patterned surface on which the geometry of the resulting nanostructures is confined, and the periodicity as described by the inverse of the FWHM, and the number of oscillations in G(r) is increased.

16. A method for the fabrication of nanostructures on polymeric surfaces by means of plasma processing and wherein the resulting polymeric surfaces have enhanced antireflective performance, which method comprises providing a polymeric surface comprising nanostructures and fabricated in accordance with any of the methods of claims 1 to 3 and 4 wherein, during the plasma treatment of step (ii) fast etching plasmas are utilised with ions having energy less than or equal to 100 eV.

17. A method for the fabrication of nanoholes or nanodots or nanocorrugated thin metal films (less than 40 nm) by means of plasma processing, wherein the metal films have modified enhanced optical properties, such as transmittance, due to the creation of surface Plasmon resonances on the metal, the method comprises providing a polymeric surface comprising nanostructures and fabricated in accordance to any of the methods in claims 1 to 3 and 4, and coating such surfaces with a thin metal film, or transferring the pattern to a thin metal film.

18. A method of forming a porous high surface area nanostructured material A, which method comprises the following steps:
  i) providing a polymeric surface B comprising nanostructures having a mound-like surface of uniformly spaced and sized protrusions and fabricated in accordance with any of the methods of claims 1 to 3 and 4; these nanostructures B lying on top of material A
  ii) effecting exposure of the material A to an etching plasma for a duration of time in excess of 10 minutes, and using a bias of (−20)-(−100) V,
  wherein a highly ordered porous medium A results, with periodic high aspect ratio and High Surface Area (HAR-HSA) nanostructures.

19. A device as claimed in claim 18, wherein the device may be used in the fabrication of a nano-scaffold to which proteins or cells may be anchored and/or wherein the device has application in cases where high surface area is required in a nanostructured form, such as nano-bioassays, or chromatography columns, or sensor active areas, or electrodes for batteries, or catalytic media.

20. A method for the fabrication of nanostructures on another surface, which method comprises the following steps:
  i) providing a patterned polymeric surface fabricated in accordance with any of the methods of claims 1 to 3 and 13; and
  ii) effecting nanoscale pattern transfer on said other surface.

21. A method as claimed in claim 20, wherein the nanoscale pattern transfer is effected on said other surface by means of a technique selected from the group consisting of anisotropic etching with the pattern acting as in situ mask; contact printing; soft lithography; electrodeposition; metallization and lift off.

22. A method as claimed in claim 20 or claim 21, wherein said other surface is an etchable hard substrate and the pattern transfer is carried out by means of anisotropic plasma etching.

\* \* \* \* \*